United States Patent [19]

Ohsaki et al.

[11] 4,134,674
[45] Jan. 16, 1979

[54] MICROFICHE RETRIEVAL SYSTEM WITH A PRINTER OPERABLE IN FOUR MODES

[75] Inventors: Mikio Ohsaki, Kashiwara; Hiroshi Kamada, Nara; Kohichi Kakimoto, Nara; Hitoshi Suzuki, Kobe; Mitsuhiro Hakaridani, Nara, all of Japan

[73] Assignee: Sharp Kabushiki Kaisha, Osaka, Japan

[21] Appl. No.: 742,232

[22] Filed: Nov. 16, 1976

[30] Foreign Application Priority Data

Nov. 17, 1975 [JP] Japan .................................. 50-138473

[51] Int. Cl.² ........................ G03B 27/52; G03B 27/50
[52] U.S. Cl. .......................................... 355/43; 355/45
[58] Field of Search .................... 355/43, 44, 45, 14, 355/40, 41, 42, 53, 54

[56] References Cited
U.S. PATENT DOCUMENTS

| 3,740,136 | 6/1973 | Maloney et al. | 355/43 |
| 3,759,611 | 9/1973 | O'Connell et al. | 355/43 |
| 3,898,003 | 8/1973 | Aronson et al. | 355/43 |

Primary Examiner—George H. Miller, Jr.
Assistant Examiner—W. J. Brady
Attorney, Agent, or Firm—Birch, Stewart, Kolasch & Birch

[57] ABSTRACT

A microfiche retrieval scheme having input means for introduction of index information indicative of desired subjects for retrieval, store means which provide pieces of frame address information for one or more microimages concerning the desired subjects in response to the index information and an optical system for projecting the selected microimages onto a viewing screen in accordance with the thus delivered frame address information. The above scheme further comprises a printer adapted to print out information contained on the microimages selected and transmitted to the optical system, a print control adapted to control the microfiche retrieval scheme and the printer and means for providing for the print control a signal indicating the printing out of the information of the selected microimages or that of their next succeeding microimages.

2 Claims, 3 Drawing Figures

MICROFICHE RETRIEVAL SYSTEM WITH A PRINTER OPERABLE IN FOUR MODES

BACKGROUND OF THE INVENTION

The present invention relates to a microfiche retrieval system provided with novel printer functions in line with its retrieval performances.

With recent development of COM (Computer Output on Microfilm) systems, designers' attention has been devoted to improvements in microfilm or microfiche retrieval systems. And, it is customary that these retrieval systems contain a printer capable of printing out their retrieval results.

However, as a matter of fact, within the above described type of the microfiche retrieval systems, no substantial attempt has been made to enhance its print out functions as compared with its advanced retrieval functions. The typical prior art systems were capable of merely printing out information about a specific microimage in a specific microfiche currently retrieved and displayed on a viewing screen onto one or more sheets.

Consequently, in the case where information after being retrieved extends over several frames in a specific microfiche, such as for literature retrieval, or in the case where according to the results of subject retrieval desired data extends over a plurality of microfiches, a print instruction should be issued for the system each time the retrieved information is visually projected onto the viewing screen. A routine of retrieval inclusive of printing out in the prior art systems needed a lot of labor and time with an accompanying reduction of the efficiency of data handling.

It is, therefore, an object of the present invention to provide a microfiche retrieval system having novel print out capabilities in line with its retrieval performances.

To sum up, in accordance with the microfiche retrieval system embodying the present invention, there are provided in addition to the conventional retrieval and print out performances:
(1) a function of automatically printing out data about continuous microimage frames; and (2) a function of automatically printing out data which extends over a plurality of microfiches selected according to subject retrieval.

BRIEF DESCRIPTION OF THE DRAWINGS

A better understanding of the invention may be had from a consideration of the following detailed description taken in conjunction with the accompanying drawings in which.

DETAILED DESCRIPTION OF THE INVENTION

Figure 1:
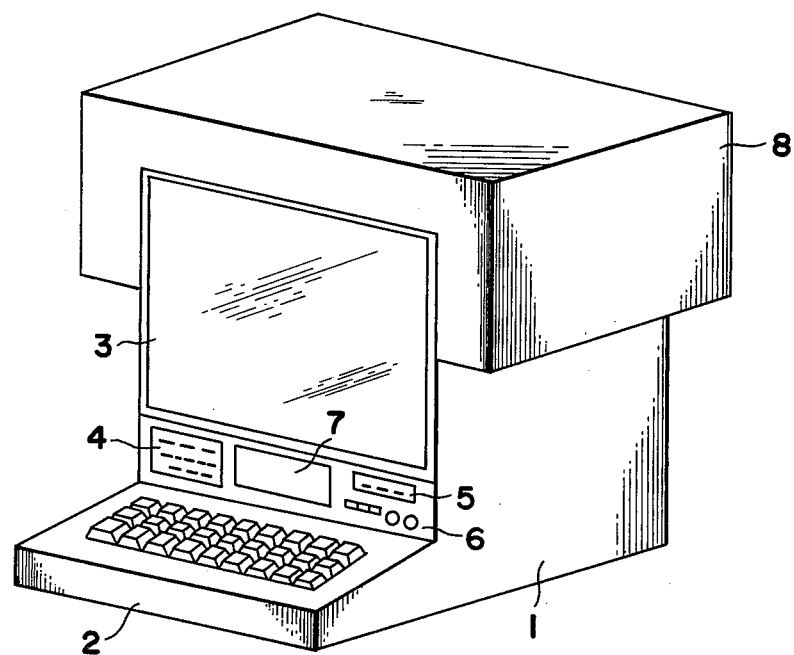
FIG. 1 is a perspective view of a microfiche retrieval system embodying the present invention in one preferred form.

Referring now to FIG. 1, there is illustrated a perspective view of one preferred form of the present invention which includes a retrieval system body 1, a keyboard 2 for entering into the system a variety of subjects for retrieval operation, a viewing screen 3 for projecting specific retrieved microimages carried on a microfiche thereon and displays 4 and 5 for providing a visual display of inputs applied via the keyboard 2, cartridge identifying numbers of mirofiches containing the specific retrieved microimages, etc. In addition, on a control console of the retrieval body 1 there are provided a set of operational switches 6 for entering of print instructions, etc., an inlet 7 for admitting cartridges each accommodating a multiplicity of microfiches therein and a printer section 8.

Figure 2:
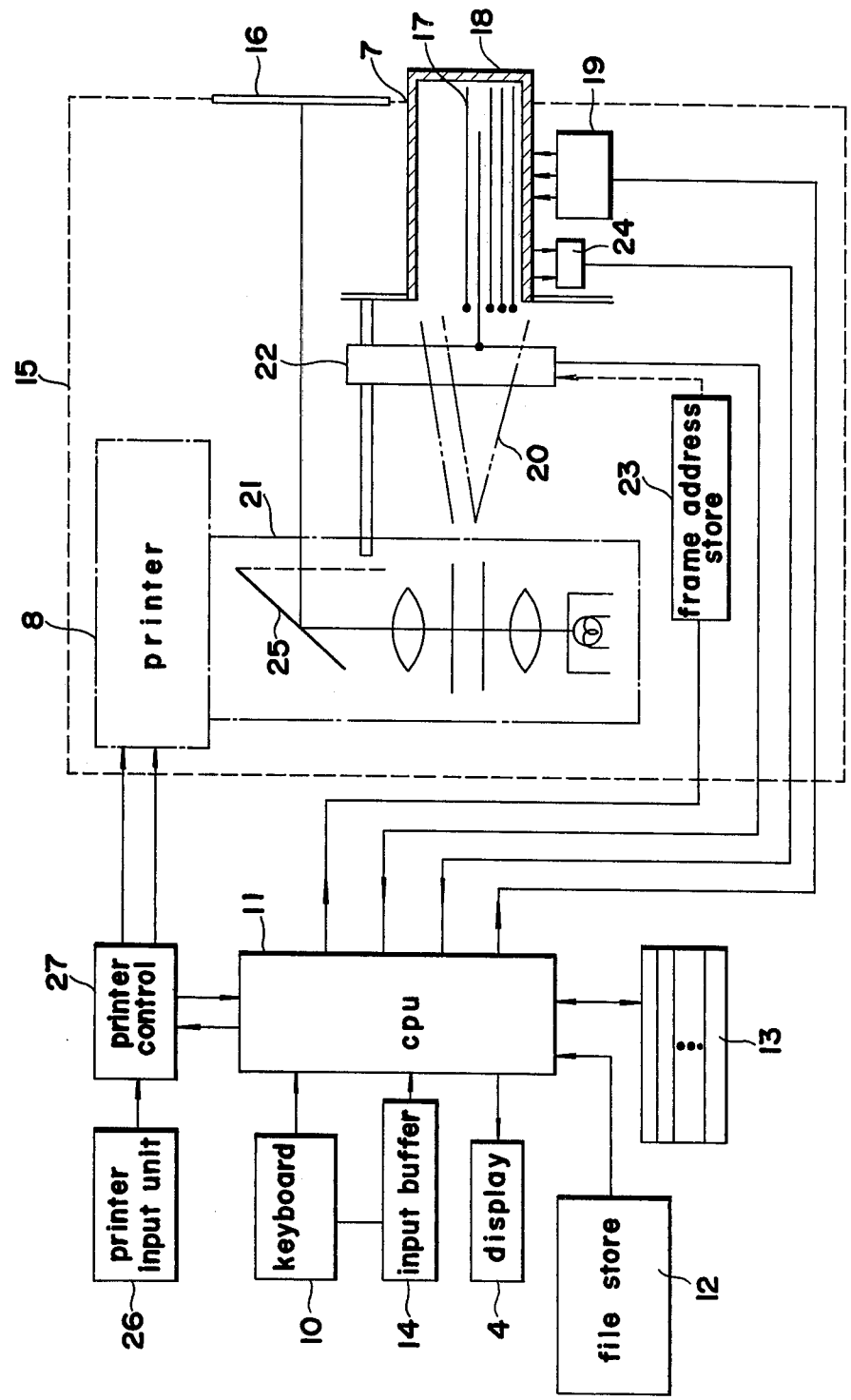
FIG. 2 is a schematic illustration of the microfiche retrieval system as shown in FIG. 1.

FIG. 2 is a schematic diagram illustrating the microfiche retrieval system of FIG. 1 and more particularly its retrieval section.

A key input unit 10 contains data entry keys for example character keys (or alphabet keys), digit keys, etc., for designation of subjects for retrieval and introduction of information sought to be registered, and function entry keys identified as WORD, START, ENTRY, CLEAR, etc. The WORD key is one that is employed in the retrieval and registry modes and instructs the beginnings of the retrieval and registry modes. The ENTRY key informs the system of the registry mode when source data is to be manually registered by using the character keys or the digit keys. The CLEAR key is to correct an error in key entry operation.

By means of the key input unit 10 discussed above, index information indicative of a specific subject to be retrieved at a higher language level is directly entered, for example in case of literature retrieval, literatures' titles, literatures' key words and authors' names such as YAMADA Taro, rather than microfiche identifying numbers and frame positioning information (frame address information) at a lower language level. Therefore, when a specific person's name is directly entered via the key input unit 10, the corresponding frame or frames containing personal information with respect to that person is automatically retrieved. Input signals applied via the key input unit 10 are loaded into a control unit 11 either directly or via an input buffer 14. The control unit 11 consists essentially of a central processor unit conventionally implemented on a one-chip large scale integrated circuit semiconductor device, a file store 12 containing a large number of pieces of the frame position information (the cartridge identifying numbers and the frame addresses) as external memory means, and a temporary store 13 temporarily containing the results of retrieval. The above described input buffer 14 temporarily contains the retrieval subjects applied via the key input unit 10. That input information is transmitted into the control unit 11, referred to as CPU hereinafter, upon receipt of inputs from the function keys, such as for example the START key.

Within the CPU 11 an arithmetic operation is carried out which detects comparison between the key input signals via the input buffer 14 and the contents of the file store 12 containing a lot of pieces of the frame position information with respect to the respective microfiches. The results of such comparison are sequentially entered into the temporary store 13.

Once retrieval is completed for all the pieces of the frame position information corresponding to the entered subject and then the temporary store 13 is loaded, the results for respective one of the frames are sequentially transmitted via the CPU 11 from the store 13 to the body 15 in reply to instructions from the function keys and then are visually displayed on the display 4. The temporary store 13 also contains an additional store storing the number of the retrieved or selected frames rather than the above discussed frame position information.

The body 15 is a device adapted to project desired information onto the viewing screen, and as described briefly above includes the viewing screen 16 and the inlet 7 for admitting the cartridges 18 each accommodating a predetermined number of the microfiches 17.

Within the interior of the body 15 there is provided a microfiche selector 19 adapted to select one of the microfiches containing the specified frame from the cartridge 18 upon receipt of retrieval signals (namely, the frame position information in the retrieval results) from the CPU 11, an X-Y axes transportation scheme 22 adapted to extract the selected one of the microfiches from the cartridge 18 and transmit the same to an optical magnification/projection system 21 through the use of a guide member 20, and a frame address store 23 adapted to control the transportation scheme 22 upon receipt of the frame address signals from the CPU 11.

With such an arrangement, when according to the retrieval results the first of the frame position information is inputted to the microfiche selector 19 and the frame address store 23, the microfiche selector 19 serves to select the desired microfiche within the cartridge 18. The thus selected microfiche is extracted and sent to the optical system with aid of the X-Y transportation 22 and then properly controlled with respect to its X and Y axes so as to position at a precise optical axis. Under these circumstances, a frame positioning completion signal (a) is developed and a control signal is sent to the CPU 11. The selected frame of the specific microfiche is projected onto the screen 16.

In FIG. 2, 24 represents a cartridge identifying number reader to read out cartridge identifying codes marked on the respective cartridges 18 when being loaded into the inlet 7. The thus read out signals are sent to the CPU 11. The optical system 21 includes a rotatable mirror 25 which normally stands at the position defined by the solid line effective to guide the microimage to the screen 16 and, upon receipt of the print instructions, shifts to the position defined by the dot line effective to guide the same to a light exposure station of the printer section 8. Associated with the printer section 8 there are an input unit 26 for receiving print operation signals and a printer control unit 27.

After completing a sequence of the events in the retrieval mode according to operation of the key input unit 10, the print instructions are inputted via the input unit 26 so that the control signal from the print control 27 permits the mirror 25 to shift to the dotted line position. The result is that the frame positioning completion signal (a) is confirmed and printing out of the microfiche loaded at the optical system 21 is performed.

As stated above, in accordance with the present system successive print out of the successive frames in the specific microfiche and successive print out of all of the retrieval results are automatically carried out in reply to the input signals from the input unit 26. To this end, the print control 27 provides the necessary control signals.

Figure 3:
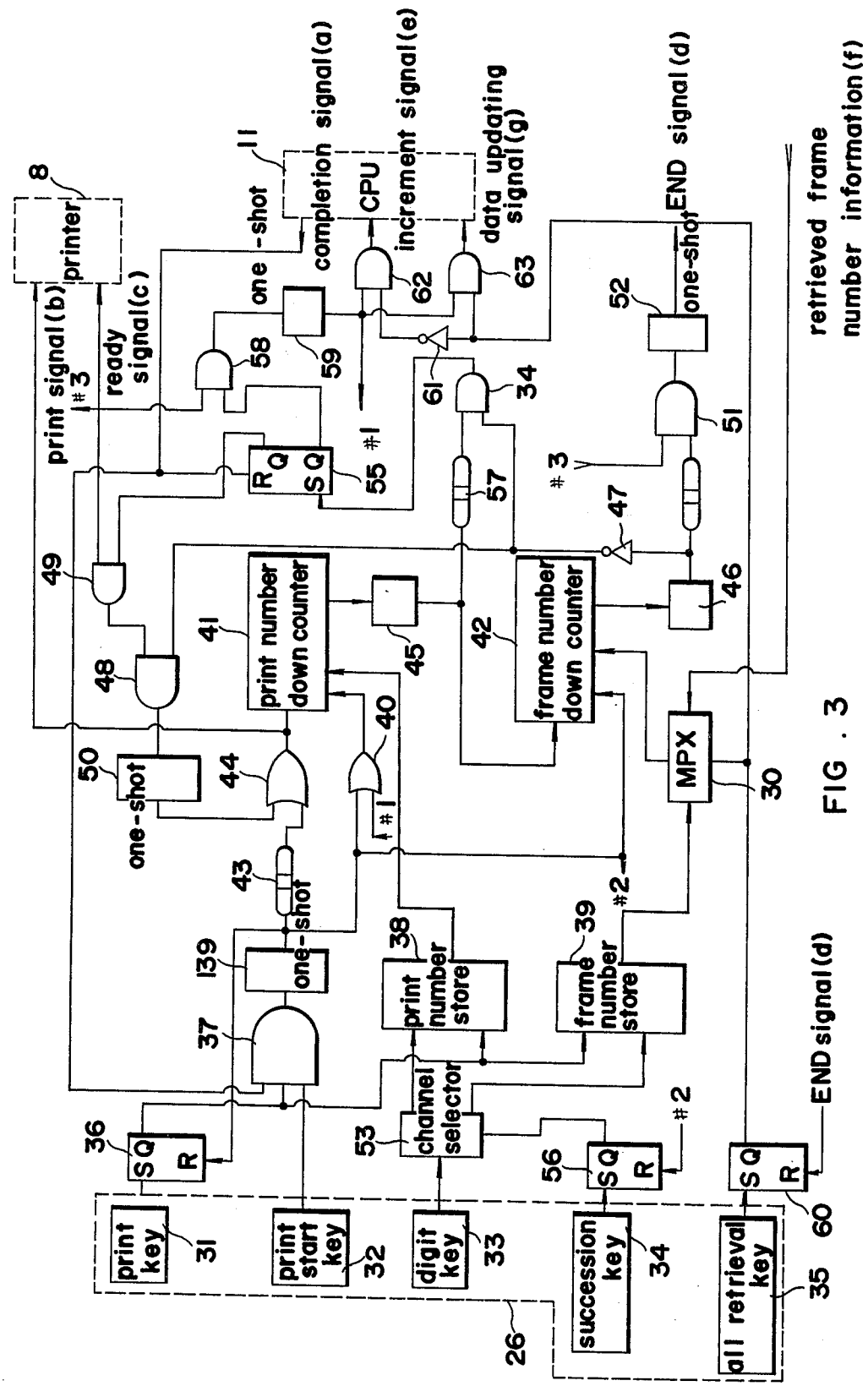
FIG. 3 is a logic diagram of a major portion of the system of FIG. 2.

With reference to FIG. 3 illustrating details of the print control 27, the print operation characterized by the present invention will be discussed in full detail.

As shown therein, the printer input unit 26 contains a print key 31, a print start key 32, the digit keys 33, a succession key 34 and an all retrieval key 35. The control 27 operates in one of the following modes in accordance with combinations of operations of the respective keys.

Printing Mode 1

When information about only the microfiche frame being visually projected onto the screen 16 is to be printed on a single sheet, the respective keys in the input unit 26 are manually operated in the order of:

That is, the print key 31 is operated to place the system into a first print mode so that a flip flop 36 is placed at its set status to hold one of input terminals of an AND gate 37 at a high level (referred to as H hereinafter). Also, a print number store 38 and a frame numberstore 39 are preset by "1." When this occurs, the frame positioning completion signal (a) indicating that the desired microfiche frame stands at a precise position in the optical system 21 has been already developed from the CPU 11. Since the remaining one of the input terminals of the AND gate 37 also is at H, the AND gate 37 will be opened immediately after manual depression of the print start key 32. A one-shot pulse generator 139 is, therefore, triggered to produce a pulse.

The thus produced pulse is supplied via an OR gate 40 to a preset control terminal of a print number designation down counter 41 and directly to the counterpart of a frame number designation shown counter 42 so as to serve as preset clock therefor. At that time both the counters 41 and 42 have been previously loaded with the contents "1" of the print number store 38 and the frame number store 39 via multiplexer 30.

A delay circuit 43 serves to delay the pulse outputted from the one-shot pulse generator 139 and lead the delayed pulse to an OR gate 44. The output terminal of the OR gate 44 is coupled with the printer section (print driver) 8 and the print number designating down counter 41. The output pulse from the pulse generator 139 is, therefore, supplied as a print instruction (b) to the printer section 8 after a predetermined period of time has elapsed. The printer section 8 is enabled to effect the printing out of the microfiche frame being now positioned within the optical system 21. Simultaneously, the print number designating down counter 41 is "1" decremented by the output of the OR gate 44 with an accompanying change in the counts from "1" to "0." The output of a zero detector 45 becomes H so that the frame number designating down counter 42 is decremented by "1". Then, the output of a zero detector 46 is H. The output H of the zero detector 46 inverted via an inverter 47 is entered into an AND gate 48 to thereby close the latter. A ready signal (c) indicating the next printing operation is developed from the printer section 8 and entered into a gate 48 via an AND gate 49. However, the ready signal (c) is not gated to the one-shot pulse generator 50. As a consequence of this, when the printing out on a single sheet is completed, the print instruction (b) based upon the output signal (c) is not supplied to the printer section 8.

The ready signal (c) triggers the one-shot pulse generator 52 via an AND gate 51 opened due to the delayed output H from the zero detector 46, thereby producing an END signal (d). The END signal (d) serves to remove the print mode of the system, for example, to return the mirror 25 in the optical system 21 from the dot line position to the solid line position. In this way, the microfiche frame being projected on the viewing screen 16 is printed out only once on a single sheet.

Printing Mode 2

When information about only the microfiche frame being visually projected onto the screen 16 is to be printed on a plurality of sheets, the keys in the input unit 26 are operated in the order of:

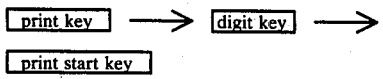

The mode of operation in printing mode 2 up to the loading of the print number store 38 and the frame number store 39 with "1" takes place in the same way as in printing mode 1. Subsequently, the digit key, or keys 33, are operated for entry of a print number "A." A channel selector 53 normally connects the digit keys 33 to the print number store 38. The print number input "A" is, therefore, supplied to the print number store 38 via the channel selector 53 with the results that the contents of the store 38 are loaded with "A."

When the print start key 32 is depressed under the circumstances, the print number designating down counter 41 and the frame number designating down counter 42 are previously loaded with "A" and "1", respectively. After passing over a predetermined period of time the print instruction (b) is issued to effect the printing out once. At the same time the down counter 41 is "1" decremented with the resulting contents "A−1."

When the first of the printing is completed, the contents of the counter 41 are not "0" so that the output of the zero detector 45 is at a low level (referring to as L hereinafter).

The AND gate 34 remains closed. The output Q of a flip flop 55 is maintained at H. Since the AND gate 49 remains open and the output of the zero detector 46 is L, the AND gate 48 also remains open such that the ready signal (c) developed from the printer section 8 upon the completion of the first printing operation triggers the one-shot pulse generator 50, thereby producing the pulse output. The resulting pulse output is again introduced as the print instruction (b) into the printer section 8 to thereby start the second printing operation. At the same time, the print number designating down counter 41 is "1" decremented with the resulting contents "A−2."

Thereafter, the printing operation is performed "A" times by repetition of the above described sequence of operation. When the contents of the counter 41 show "0", the output of the zero detector 45 is H so that the frame number designating down counter 42 is "1" decremented with an accompanying change in the contents from "1" to "0." Therefore, the output of the zero detector 46 assumes H and is introduced via the inverter 47 into the AND gate 48, which in turn is closed to prevent further application of the ready signal (c) to the one-shot pulse generator 50. Thus, the printing operation is stopped. The development of the END signal (d) is accomplished in the same manner as the above paragraph (1).

Printing Mode 3

When a plurality of successive microfiche frames are to be printed on a plurality of sheets, the operational mode in the input unit 26 is effected in the order of:

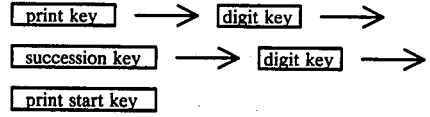

When the print key 31 is operated and the print number "A" is entered via the digit key 33 into the store 38 in the same manner as in printing mode 2. Subsequently, upon depression of the succession key 34 a flip flop 56 is set with its Q output changing the channel selector 53 such that the output of the digit key 33 is connected to the frame number designating store 39. Therefore, if the number "B" of successive frames desired to be printed is inputted via the digit key 33, the frame number designating store 39 is loaded with "B."

When the print start key 32 is depressed under these circumstances, the print number designating down counter 41 is loaded with "A" while the frame number designating down counter 42 is loaded with "B." A print routine is initiated.

Because the contents of the counter 41 are "A," the printing operation is performed "A" times for one frame, as discussed with respect to printing mode 2. Once the printing is effected "A" times for the first microfiche frame in this manner, "0" is reached by the counter 41 to render the output of the zero detector 45 H. This signal is time-delayed for a fixed period of time via a delay circuit 57 and then applied to the AND gate 34. Since the inversion H of the output L from the zero detector 46 renders the AND gate 54 open, the delayed signal is permitted to enter into the flip flop 55. For this reason, the output $\overline{Q}$ of the flip flop 55 is L and the AND gate 49 is closed to thereby prevent the next succeeding ready signal from the printer section 8 from being applied thereto. Accordingly, the print routine is temporarily interrupted.

Meantime, the output Q of the flip flop 55 is raised to H due to its set input and the opened AND gate 58 permits the ready signal (c) to trigger the one-shot pulse generator 59. The OR gate 40 gates a new preset clock signal to the counter 41. It means that the counter 41 is again loaded with "A." It will be noted that a flip flop 60 responsive to the input from the all retrieval key 35 is not placed into its set state with its output of L. An input to an AND gate 62 via an inverter 61 is still maintained at H. The output signal from the one-shot pulse generator 59 permits an increment signal (e) to be developed from the AND gate 62. The increment signal (e) is to be supplied to the CPU 11. The increment signal (e) is a signal that is used for the purpose of positioning the next succeeding microfiche frame within the optical system 21 with one-step advance. In fact, this permits the contents of the frame address store 23 to be incremented by "1". With such an increment in the contents of the address store 23, the X-Y transportation means 22 is energized to transport the next succeeding frame so as to project the same onto the viewing screen 16.

When the transportation is terminated in a manner to precisely position the next succeeding frame within the optical system 21, the frame positioning completion signal (a) is again changed from L to H. Such change forces the flip flop 55 into its reset state with its Q output of H. The AND gate 49 is opened. The ready signal (c) triggers the one-shot pulse generator 50 to create the print instruction (b) via the OR gate 44. In this manner, the printing is again repeated "A" times.

It is obvious that the frame number designating down counter 42 is decremented by "1" by the H output of the zero detector 45 with the resulting contents "B−1" under these circumstances.

The printing for "A" duplicate and "B" frame is performed by the repeated operations set forth above. The frame number designating down counter 42 reaches "0" and the output of the zero detector 46 reaches H. The END signal is developed in the same manner as described above to clear away the print mode. Multiple copies of the plurality of the successive microfiche frames are attained (of course, one copy is obtainable.)

Printing Mode 4

When all the microfiche frames retrieved from the results of a retrieval mode are to be printed on one or more copy sheets, the input unit 26 is operated as follows:

wherein in case of one copy operation of the digit key 33 is omitted.

The necessary number of copies "A" is loaded into the print number store 38 by successive operations of the print key 31 and the digit key 33. Upon operation of the all retrieval key 35, the flip flop 60 is set to provide its Q output effective to switch the multiplexer 30. With aid of the preset clock due to operation of the print start key 32, the frame number down counter 42 receives information (f) indicative of the total number of the retrieved frames and is therefore loaded with the number "C" of the retrieved frames. The information "C" is stored within the store 13 of FIG. 2 together with the frame address information developed from retrieval results.

The one-shot pulse generator 139 outputs the pulse which in turn is supplied as the print instruction (b) to the printer section 8. The printing is performed "A" times in the same manner as described with respect to the printing mode 2, "A" being previously loaded into the down counter 41.

Upon completion of "A" copies printing the output of the zero detector 45 is raised to H to render the AND gate 49 closed and to interrupt the printing. The same is described with respect to printing mode 3. Nevertheless, the one-shot pulse generator 59 is triggered by the output of the AND gate 58 at its open state due to the Q output (H) of the flip flop 55. The output of the pulse generator 59 is derived from an AND gate 63 at its open state due to the Q output (H) of the flip flop 60. This is entered as a data updating signal (g) into the CPU 11.

On arrival of the data updating signal (g) the CPU 11 demands that the store 13 should deliver the address information about the next retrieved frame. The address information is sent to the frame address store 23. The X-Y transportation 22 is properly activated so as to accurately position the next frame within the optical system 21. In case where the next frame in question is contained within a different microfiche, the present microfiche is put back into the cartridge 18 and then a new microfiche is selected and loaded.

Upon positioning the next microfiche frame, the completion signal (a) varies again from L to H. This variation resets the flip flop 55 of which the $\overline{Q}$ output assumes H. The AND gate 49 is opened and closed to start the printing of "A" copies. When this occurs, the contents of the down counter 42 is "1" decremented in response to the H output of the zero detector 45 with the resulting contents of "C−1."

A sequence of the above described operation is repeated "C" times to thereby terminate the printing of "A" copies for all the retrieved frames "C." The output H of the zero detector 46 allows the provision of the END signal.

As noted earlier, the print function of the present invention includes the four print modes and more particularly the key features of the present invention reside in the novel print modes as set forth with respect to the third and fourth printing modes rather than the conventional print modes of printing modes 1 and 2. The novel print modes 3 and 4 assure a further simplicity in retrieval procedure inclusive of printing out.

Although there has been described above specific arrangements of the microfiche retrieval system in accordance with the invention for the purpose of illustrating the manner in which the invention may be used to advantage, it will be appreciated that the invention is not limited thereto. Accordingly, any modifications, variations or equivalent arrangements which may occur to those skilled in the art should be considered to be within the scope of the invention.

What is claimed is:

1. A microimage display, retrieval, and printing system comprising:
    keyboard means for selectively retrieving a microimage to be retrieved from a plurality of microimage frames having predetermined frame addresses;
    memory means for storing the total number of microimage frames retrieved by said keyboard means during a given viewing interval and the frame addresses of each of said microimage frames so retrieved;
    printer means for selectively printing out information contained in a selected one, or plurality, of said retrieved microimage frames; and
    printer control means including means for constraining said printer means to print out the information in each of said retrieved microimage frames stored in said memory means during said viewing interval irrespective of whether said microimage frames are consecutively disposed.

2. The device of claim 1 wherein said printer control means further includes:
    means for selectively constraining said printer means to print one or more copies of only one of said retrieved microimage frames; and
    means for selectively constraining said printer means to print one or more copies of each of a plurality of consecutive frames of said retrieved microimage frames.

* * * * *